(12) United States Patent
Takeyama et al.

(10) Patent No.: US 10,864,784 B2
(45) Date of Patent: Dec. 15, 2020

(54) TRANSMITTER, TRIGGER DEVICE, TRANSMITTER MODE SETTING SYSTEM, AND TRANSMITTER MODE SETTING METHOD

(71) Applicant: PACIFIC INDUSTRIAL CO., LTD., Ogaki (JP)

(72) Inventors: Takashi Takeyama, Ichinomiya (JP); Takahito Obata, Hashima (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 0 days.

(21) Appl. No.: 16/306,644

(22) PCT Filed: Dec. 1, 2017

(86) PCT No.: PCT/JP2017/043277
§ 371 (c)(1),
(2) Date: Apr. 29, 2019

(87) PCT Pub. No.: WO2019/106828
PCT Pub. Date: Jun. 6, 2019

(65) Prior Publication Data
US 2019/0275848 A1    Sep. 12, 2019

(51) Int. Cl.
*B60C 23/04*        (2006.01)
*H04B 1/034*        (2006.01)

(52) U.S. Cl.
CPC ...... *B60C 23/0454* (2013.01); *B60C 23/0455* (2013.01); *B60C 23/0461* (2013.01); *B60C 23/0479* (2013.01); *H04B 1/034* (2013.01)

(58) Field of Classification Search
CPC ............ B60C 23/0454; B60C 23/0455; B60C 23/0461; B60C 23/0479; H04B 1/034
See application file for complete search history.

(56) References Cited

U.S. PATENT DOCUMENTS 9,120,357 B2 *  9/2015  Deniau ............... B60C 23/0479
9,122,423 B2 *  9/2015  McIntyre ........... B60C 23/0471
(Continued)

FOREIGN PATENT DOCUMENTS

CN    102529607 A    7/2012
JP    200617463 A    1/2006
(Continued)

OTHER PUBLICATIONS

International Search Report for PCT/JP2017/043277 filed Dec. 1, 2017 (2 pages).

(Continued)

*Primary Examiner* — Nguyen T Vo
(74) *Attorney, Agent, or Firm* — Cantor Colburn LLP

(57) ABSTRACT

A transmitter is mounted on each of a plurality of wheel assemblies included in a vehicle. The transmitter executes a process in accordance with a command included in a trigger signal. The transmitter includes a pressure sensor that detects the tire pressure, a transmission unit that transmits a data signal including a detection result of the pressure sensor to a receiver, a trigger reception unit that receives the trigger signal, and a controller that controls the transmitter. When the trigger reception unit receives the trigger signal including a command shifting a state of the transmitter to a standby state, the controller shifts the state of the transmitter to the standby state. Further, when the trigger reception unit receives the trigger signal including a command designating a mode while the state of the transmitter is the standby state, the controller sets the designated mode.

3 Claims, 2 Drawing Sheets

(56) References Cited

U.S. PATENT DOCUMENTS

| | | | | |
|---|---|---|---|---|
| 10,086,661 B2 * | 10/2018 | Tsujita | ............ | B60C 11/243 |
| 2018/0194176 A1 * | 7/2018 | Bout | ............ | B60C 23/0471 |
| 2018/0312182 A1 * | 11/2018 | Prestail | ............ | B61L 15/0063 |

FOREIGN PATENT DOCUMENTS

| | | | |
|---|---|---|---|
| JP | 201229027 A | 2/2012 |
| JP | 201491344 A | 5/2014 |
| JP | 201694036 A | 5/2018 |

OTHER PUBLICATIONS

Office Action issued in Chinese Patent Application No. 201780036019.3 dated Sep. 28, 2020; 4 pages.

\* cited by examiner

| Vehicle Model | Format |
|---|---|
| Vehicle Model A | Format A |
| Vehicle Model B | |
| Vehicle Model C | |
| Vehicle Model D | Format B |
| Vehicle Model E | |
| Vehicle Model F | |
| Vehicle Model G | |
| Vehicle Model H | |
| Vehicle Model I | |

TRANSMITTER, TRIGGER DEVICE, TRANSMITTER MODE SETTING SYSTEM, AND TRANSMITTER MODE SETTING METHOD

TECHNICAL FIELD

The present invention relates to a transmitter, a trigger device, a transmitter mode setting system, and a transmitter mode setting method.

BACKGROUND ART

Patent document 1, for example, describes a tire condition monitoring apparatus arranged in a vehicle, which includes a plurality of wheel assemblies. The tire condition monitoring apparatus described in patent document 1 includes a transmitter, which is mounted on each wheel assembly, and a receiver.

The transmitter includes a pressure sensor that detects the tire pressure, a transmission unit, and a controller that controls the transmitter. The transmission unit transmits a data signal including a detection result of the pressure sensor. For example, the transmission unit transmits the data signal at predetermined intervals.

Further, the transmitter includes a trigger reception unit configured to receive a trigger signal transmitted from a trigger device. The trigger signal is transmitted from the trigger device when externally issuing a command to the transmitter. The trigger signal is transmitted, for example, at any given time when there is a need for a data signal to be transmitted or the mode of the transmitter to be changed. The trigger reception unit receives the trigger signal, and the controller executes control in accordance with the command.

PRIOR ART LITERATURE

Patent Literature

Patent Document 1: Japanese Laid-Open Patent Publication No. 2014-91344

SUMMARY OF THE INVENTION

Problem to be Solved by the Invention

The transmitter moves together with the vehicle. Accordingly, the ambient environment of the transmitter changes as the vehicle moves. Depending on the ambient environment, external noise (radio wave) may be transmitted on a frequency band that is the same as or approximate to the frequency band of the trigger signal. If the trigger reception unit receives the external noise, the transmitter may be set to an unintended mode by the external noise.

One object of the present invention is to provide a transmitter, a trigger device, a transmitter mode setting system, and a transmitter mode setting method that restricts the setting of the transmitter to an unintended mode.

Means for Solving the Problem

In accordance with a first embodiment, the present invention that achieves the above object provides a transmitter mounted on each of a plurality of wheel assemblies included in a vehicle and executing a process in accordance with a command included in a trigger signal. The transmitter includes a pressure sensor configured to detect the tire pressure, a transmission unit configured to transmit a data signal including a detection result of the pressure sensor to a receiver, a trigger reception unit configured to receive the trigger signal, and a controller configured to control the transmitter. The controller is configured so that when the trigger reception unit receives the trigger signal including a command shifting a state of the transmitter to a standby state, the controller shifts the state of the transmitter to the standby state. The controller is further configured so that when the trigger reception unit receives the trigger signal including a command designating a mode while the state of the transmitter is the standby state, the controller sets the designated mode.

Accordingly, when the trigger reception unit receives the trigger signal including the command designating the mode while the state of the transmitter is the standby state, the controller sets the designated mode. To set the mode, the state of the transmitter needs to be shifted to the standby state. When setting the mode with the trigger device, two steps, namely, shifting to the standby state and setting of the mode need to be performed. Even when the controller erroneously recognizes external noise as the trigger signal, as long as the erroneous recognition occurs only once, this will only result in the state of the transmitter being shifted to the standby state and the mode would not be set. This restricts the setting of the transmitter to an unintended mode by external noise.

The above transmitter is configured to select and function in one of a plurality of formats, and the mode may include the format.

This restricts the setting of the transmitter to an unintended format by external noise.

In accordance with a second embodiment, the present invention that achieves the above object provides a trigger device configured to transmit a trigger signal to a transmitter that is mounted on each of a plurality of wheel assemblies included in a vehicle and executes a process in accordance with a command included in the trigger signal. The trigger device includes a trigger device transmission unit configured to transmit the trigger signal, and a trigger device controller configured to control the trigger device. The trigger device controller is configured to transmit from the trigger device transmission unit the trigger signal including a command shifting a state of the transmitter to a standby state that allows a mode to be set, and the trigger signal including a command designating the mode of the transmitter.

This allows the state of the transmitter to be shifted to the standby state by the trigger device. The designation of the mode performed with the trigger device after the state of the transmitter has been shifted to the standby state results in the mode setting of the transmitter to the designated mode. Thus, even with the transmitter of which the mode is set through two steps, namely, the shifting to the standby state and the designation of the mode, the mode can be set with the trigger device. This allows the transmitter of which the mode is set through two steps, namely, the shifting to the standby state and the designation of the mode, to be used as a transmitter mounted on the wheel assembly. As described above, this transmitter restricts the setting to an unintended mode by external noise.

In the above trigger device, the transmitter may be configured to select and function in one of a plurality of formats, and the trigger device controller is configured so that when the format is input, the trigger device controller sequentially transmits from the trigger device transmission unit the trigger signal including the command shifting the state of the transmitter to the standby state and the trigger signal including the command designating the format as the mode.

Accordingly, the input of the format results in the sequential transmission of the trigger signal shifting the state of the transmitter to the standby state and the trigger signal designating the format. This allows an operator of the trigger device to set the format of the transmitter by inputting the format. Compared to when performing separate operations to transmit the trigger signal shifting the state of the transmitter to the standby state and to transmit the trigger signal designating the mode, the burden on the operator is reduced.

In accordance with a third embodiment, the present invention that achieves the above object provides a transmitter mode setting system. The transmitter mode setting system includes a transmitter that is mounted on each of a plurality of wheel assemblies included in a vehicle, and a trigger device that transmits a trigger signal including a command to the transmitter. In the system, a mode of the transmitter is set with the trigger device. The trigger device includes a trigger device transmission unit configured to transmit the trigger signal, and a trigger device controller configured to control the trigger device. The trigger device controller is configured to have the trigger device transmission unit transmit the trigger signal including a command shifting a state of the transmitter to a standby state that allows the mode to be set, and the trigger signal including a command designating the mode of the transmitter. The transmitter includes a pressure sensor configured to detect the tire pressure, a transmission unit configured to transmit a data signal including a detection result of the pressure sensor to a receiver, a trigger reception unit configured to receive the trigger signal, and a controller configured to control the transmitter. The controller is configured so that when the trigger reception unit receives the trigger signal including the command shifting the state of the transmitter to the standby state, the controller shifts the state of the transmitter to the standby state. The controller is further configured so that when the trigger reception unit receives the trigger signal including the command designating the mode while the state of the transmitter is the standby state, the controller sets the designated mode.

This allows the transmitter of which the mode is set through two steps, namely, the shifting to the standby state and the designation of the mode, to be used as a transmitter mounted on the wheel assembly. Thus, the setting of the transmitter to an unintended mode by external noise is restricted.

In accordance with a fourth embodiment, the present invention that achieves the above object provides a method for setting a mode of a transmitter with a trigger device. The method includes transmitting a trigger signal including a command shifting a state of the transmitter to a standby mode that allows the mode to be set from the trigger device. The method further includes setting the mode of the transmitter by transmitting a trigger signal including a command designating the mode after shifting the state of the transmitter to the standby state from the trigger device.

This allows the state of the transmitter to be shifted to the standby state. Thus, the transmitter of which the mode is set through two steps, namely, the shifting to the standby state and the designation of the mode, can be used as a transmitter mounted on the wheel assembly. This transmitter restricts the setting to an unintended mode by external noise.

Effect of the Invention

The present invention restricts the setting of the transmitter to an unintended mode.

EMBODIMENTS OF THE INVENTION

A transmitter, a trigger device, a transmitter mode setting system, and a transmitter mode setting method according to one embodiment will now be described.

Figure 1:
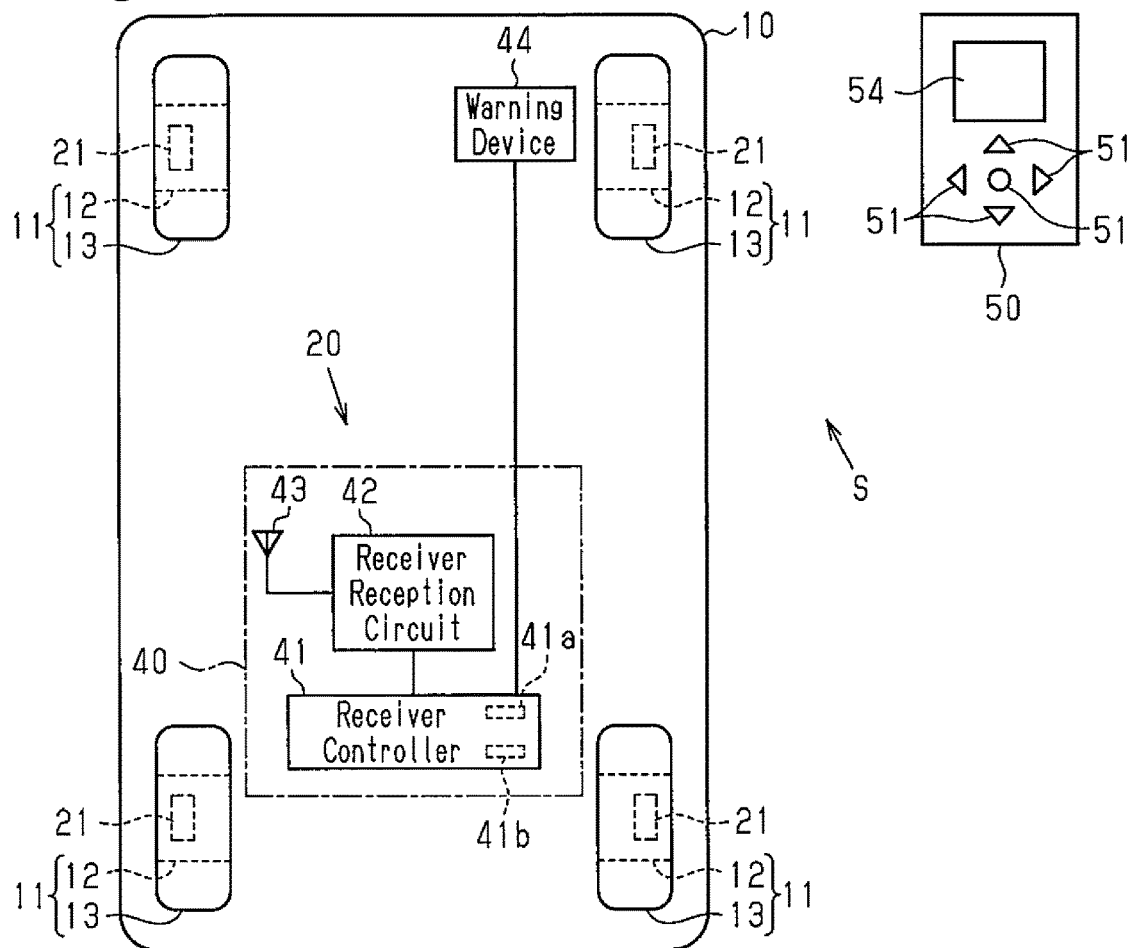
FIG. 1 is a schematic diagram of a tire condition monitoring apparatus and a trigger device.

As shown in FIG. 1, a tire condition monitoring apparatus 20 includes transmitters 21 that are respectively mounted on four wheel assemblies 11 of a vehicle 10 and a receiver 40 that is arranged in the vehicle 10. Each wheel assembly 11 includes a wheel 12 and a tire 13, which is mounted on the wheel 12. The transmitter 21 may be a transmitter fixed to a tire valve or a transmitter fixed to the wheel 12 and the tire 13.

The transmitter 21 is coupled to the wheel assembly 11 so as to be located in the interior of the tire 13. The transmitter 21 detects the condition of the corresponding tire 13, for example, the air pressure of the tire 13 and the temperature inside the tire 13, and transmits a data signal including the detection results to the receiver 40. The tire condition monitoring apparatus 20 receives the data signal transmitted from the transmitter 21 and monitors the condition of the tire 13.

Figure 2:
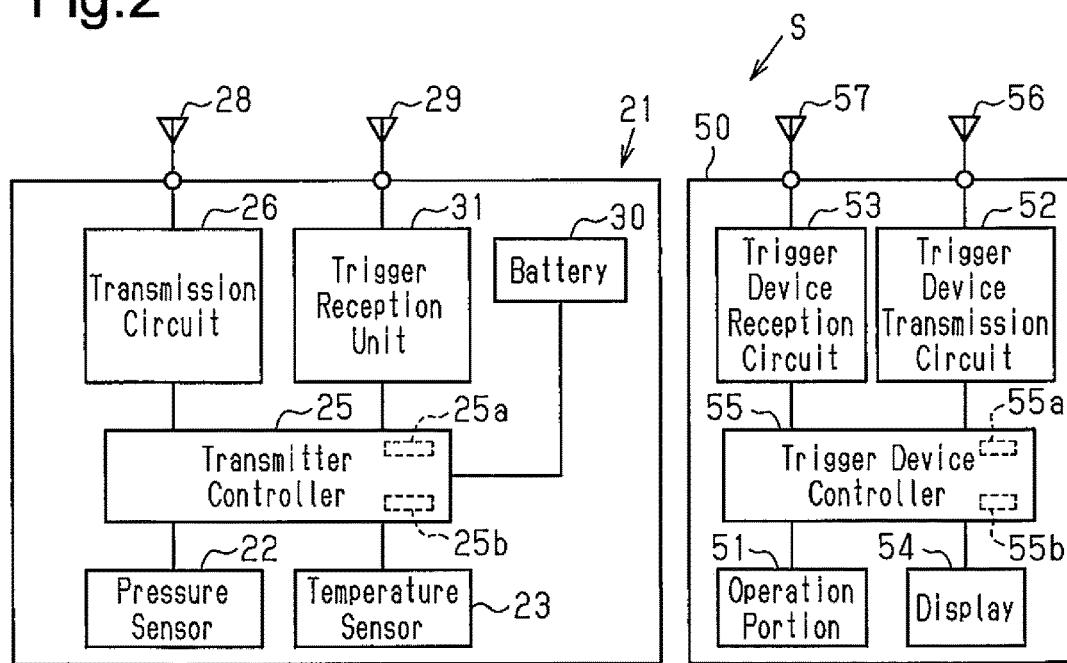
FIG. 2 is a schematic diagram showing a configuration of a transmitter and the trigger device.

As shown in FIG. 2, the transmitter 21 includes a pressure sensor 22, a temperature sensor 23, a transmitter controller 25, a transmission circuit 26, a transmission antenna 28, a reception antenna 29, a battery 30, and a trigger reception unit 31. The battery 30 is a power source of the transmitter 21.

The pressure sensor 22 detects the pressure (air pressure) of the corresponding tire 13. The pressure sensor 22 outputs the detection result to the transmitter controller 25. The temperature sensor 23 detects the temperature inside the corresponding tire 13. The temperature sensor 23 outputs the detection result to the transmitter controller 25.

The transmitter controller 25, which serves as a controller, is configured by a microcomputer or the like including a CPU 25a and a memory 25b (RAM, ROM, or the like). An ID code that is identification information unique to each transmitter 21 is registered to the memory 25b. Further, the memory 25b stores various programs to control the transmitter 21.

The transmitter controller 25 may include exclusive hardware (application specific integrated circuit: ASIC) to execute at least part of a process. More specifically, the transmitter controller 25 can be a circuit (circuitry) that includes 1) one or more processors that run on a computer program (software), 2) one or more exclusive hardware circuits such as an ASIC, or 3) a combination of the above. A processor includes a CPU and a memory such as a RAM or a ROM. The memory stores program codes or commands that are configured to have the CPU execute a process. The memory, which is a computer readable medium, may be any available medium that is accessible by a versatile or a dedicated computer.

The transmitter controller 25 generates and outputs data to the transmission circuit 26. The transmission circuit 26, which serves as a transmission unit, modulates the data received from the transmitter controller 25 to generate a signal (RF signal) and transmits the signal from the transmission antenna 28. For example, the transmitter controller 25 receives detection results from the pressure sensor 22 and the temperature sensor 23 to generate data that includes the tire condition (air pressure of tire, inner temperature of tire) and an ID code. The transmitter controller 25 then transmits a data signal including the data.

The trigger reception unit 31 receives a trigger signal transmitted from a trigger device 50. The trigger reception unit 31 includes a filter and an amplification circuit. The filter allows for passage of, among signals that have reached the reception antenna 29, only signals of a certain frequency band. The amplification circuit amplifies the signals.

The trigger signal is an LF band (long wave band) signal. The trigger device 50 is a device that transmits a trigger signal including a command, which is issued to the transmitter 21, and has the transmitter 21 execute various operations. The transmitter controller 25 executes processes in accordance with the command included in the trigger signal, which is received by the trigger reception unit 31.

The transmitter 21 is operable in a plurality of modes. The modes include modes related to the transmission protocol of the transmitter 21 such as a sleep mode and an emergency mode. In the sleep mode, a data signal is not transmitted. In the emergency mode, a data signal is transmitted at short intervals. Further, the modes include formats of the transmitter 21. The transmitter 21 of the present embodiment is configured to select and function in one of a plurality of formats. Depending on the format, the transmitter 21 functions differently. Accordingly, each format is a different mode.

The memory 25b stores format information for the transmitter 21 to function in the plurality of formats. The format of the transmitter 21 is associated with the vehicle model. Each format corresponds to a plurality of vehicle models.

Figures 3, 4:
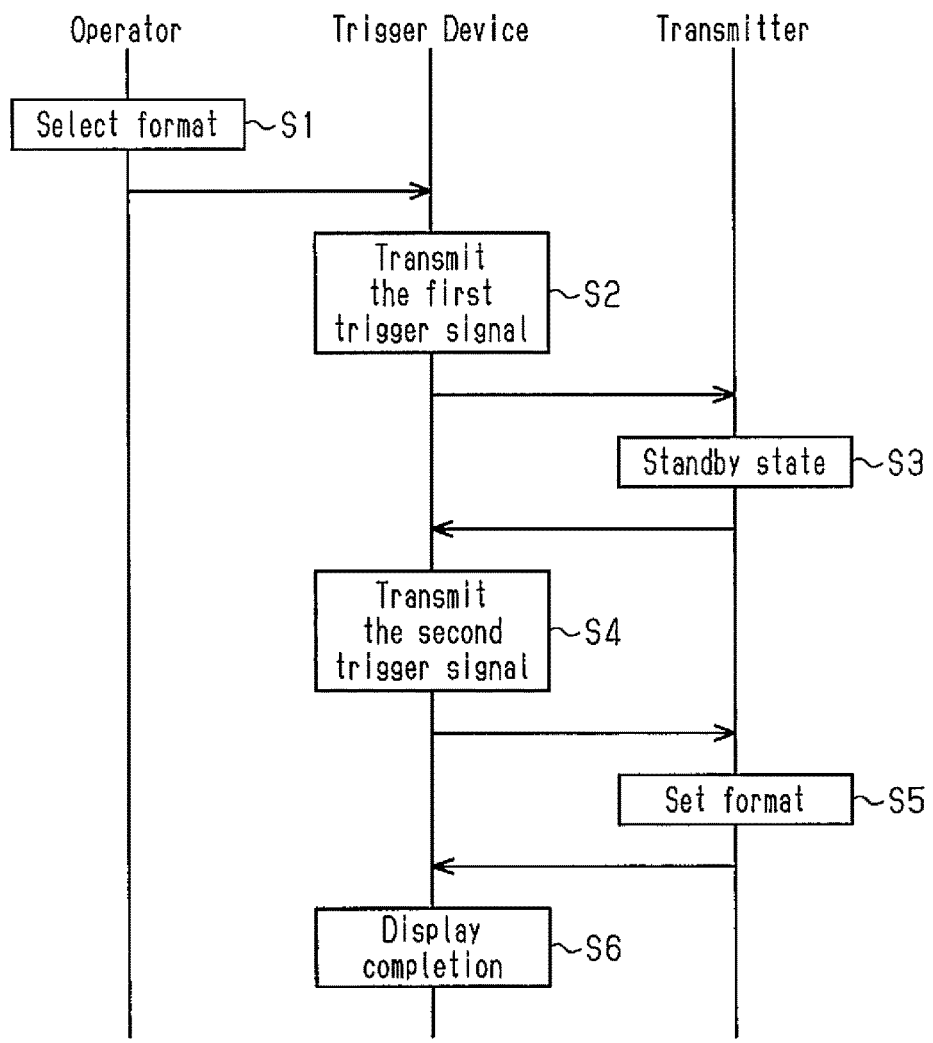
FIG. 3 is a schematic diagram showing the relationship between vehicle models and transmitter formats.
FIG. 4 is a schematic diagram illustrating interactions between an operator, the trigger device, and the transmitter.

For example, as shown in FIG. 3, format A corresponds to vehicle models A, B, and C. Further, format B corresponds to vehicle models D, E, and F. The number of vehicle models that corresponds to one format differs between the formats. Even when the model names are the same, "vehicle models" are considered to be different if the model years are different.

The protocol of the receiver 40 differs depending on the vehicle model. Accordingly, a frame format specified by the protocol also differs depending on the vehicle model. Unless the data signal is in compliance with the protocol of the receiver 40, the receiver 40 cannot receive a data signal. Referring to the example shown in FIG. 3, the transmitter 21 that functions in format A allows the receiver 40 of vehicle models A, B, and C to receive data signals but does not allow the receiver 40 of other vehicle models to receive data signals. The format information is information of the standard that enables communication with the receiver 40. Further, depending on the formats, data signals are transmitted at different intervals and the resolution capability of pressure data and temperature data varies.

In the present embodiment, the memory 25b stores format information of the plurality of formats, and the transmitter 21 is configured to select and function in one of the plurality of formats. The transmitter 21 functions in the selected format. Accordingly, the transmitter 21 corresponds to more vehicle models compared to a transmitter that functions only in one format.

The memory 25b stores programs for each format so that the transmitter 21 functions in one of the plurality of formats. The transmitter 21 runs on a program corresponding to the selected format. Alternatively, the memory 25b may store a single program as format information, and the processing procedures may be externally changed so that the transmitter 21 functions in the selected format. That is, the transmitter 21 may be controlled in any manner as long as the format is selected from the plurality of formats and the transmitter 21 functions in the selected format.

The transmitter controller 25 is configured to shift the state of the transmitter 21 to a standby state. The standby state is a state in which the format of the transmitter 21 can be set. When the transmitter 21 is in a prohibition state that differs from the standby state, the format of the transmitter 21 cannot be set.

As shown in FIG. 1, the receiver 40 includes a receiver controller 41, a receiver reception circuit 42, and a reception antenna 43. The receiver controller 41 is connected to a warning device 44. The receiver controller 41 is configured by a microcomputer or the like including a receiver CPU 41a and a receiver memory 41b (RAM, ROM, or the like). The receiver reception circuit 42 receives a data signal from each transmitter 21 via the reception antenna 43. The receiver reception circuit 42 demodulates and outputs the data signal to the receiver controller 41.

The receiver memory 41b stores the ID code of the transmitter 21 mounted on each wheel assembly 11. This associates the transmitter 21 with the receiver 40. The receiver controller 41 verifies the ID code included in the data signal, which is received by the receiver reception circuit 42, with the ID code stored in the receiver memory 41b. As a result of the verification, when the ID code included in the data signal matches the registered ID code, the receiver controller 41 employs the data included in the data signal. The receiver controller 41 detects the condition of the tire 13 from the data included in the data signal transmitted from the transmitter 21, which is associated with the receiver 40. When there is an anomaly in the tire 13, the receiver controller 41 issues a notification with the warning device 44 (notification device). The warning device 44 may be a device that issues a notification of an anomaly by continuously illuminating or intermittently illuminating a light or a device that issues a notification of an anomaly by producing sound. Alternatively, the receiver controller 41 may show the condition of the tire 13 on a display that is visible to the occupant of the vehicle 10.

As described above, the transmitter 21 functions in one of the plurality of formats. The trigger device 50 is used to set the format. Each transmitter 21 and the trigger device 50 function as a transmitter mode setting system S. The trigger device 50 will now be described in detail.

As shown in FIGS. 1 and 2, the trigger device 50 includes a plurality of operation portions 51, a trigger device transmission circuit 52, a trigger device reception circuit 53, a display 54, a trigger device controller 55, a trigger device transmission antenna 56, and a trigger device reception antenna 57. Each operation portion 51 is operated by an operator of the trigger device 50. The operation portions 51 include selection keys and an enter key. The selection keys select one of the selections (menu) displayed on the display 54. The enter key enters the selection. The operator operates the operation portions 51 so as to have the trigger device 50 perform various actions.

The operation portions 51 are connected to the trigger device controller 55. The trigger device controller 55 is configured by a microcomputer or the like including a CPU 55a and a memory 55b (RAM, ROM, or the like). The memory 55b stores commands (command=data string) that correspond to the actions that are to be performed by the transmitter 21. The commands stored in the memory 55b include a command that shifts the state of the transmitter 21 to the standby state and a command that designates the format of the transmitter 21. The command shifting the state of the transmitter 21 to the standby state may differ between the formats of the transmitter 21 or the vehicle models. Alternatively, the command shifting the state of the transmitter 21 to the standby state may be the same regardless of the format of the transmitter 21 or the vehicle model. The command designating the format of the transmitter 21 differs between the formats.

The trigger device controller 55 may include exclusive hardware (application specific integrated circuit: ASIC) to execute at least part of a process. More specifically, the trigger device controller 55 can be a circuit (circuitry) that includes 1) one or more processors running on a computer program (software), 2) one or more exclusive hardware circuits such as an ASIC, or 3) a combination of the above. A processor includes a CPU and a memory such as a RAM or a ROM. The memory stores program codes or commands that are configured to have the CPU execute a process. The memory, which is a computer readable medium, may be any available medium that is accessible by a versatile or dedicated computer.

The trigger device controller 55 generates data in accordance with the operation by the operation portions 51. The data includes the command determined by the operation portions 51.

As described above, the operator can set (select) the format of the transmitter 21 with the trigger device 50. When setting the format of the transmitter 21, the operator operates the operation portions 51 to select the format corresponding to the vehicle model of the vehicle 10 on which the transmitter 21 is mounted. The operator may directly select the format with the trigger device 50. Alternatively, the operator may select the vehicle model, and the trigger device controller 55 may select the format. For example, as shown in FIG. 3, the memory 55b stores the formats corresponding to each vehicle model. The operator operates the operation portions 51 to select the manufacturer, the model name, and then the model year. The trigger device controller 55 selects the format corresponding to the selected vehicle model. Further, for example, when selecting format A shown in FIG. 3, format A may be directly selected, or the selection of vehicle model A, B, or C may result in the selection of format A. The trigger device controller 55 generates data including a command that corresponds to the selected format.

The trigger device controller 55 outputs the generated data to the trigger device transmission circuit 52. The trigger device transmission circuit 52, which serves as a trigger device transmission unit, generates a trigger signal in accordance with the data. The trigger signal is transmitted from the trigger device transmission antenna 56.

The trigger device reception circuit 53 receives a signal returned from the transmitter 21 via the trigger device reception antenna 57. The trigger device reception circuit 53 demodulates the signal returned from the transmitter 21 and outputs the data to the trigger device controller 55.

Processes executed by the trigger device controller 55 and the transmitter controller 25 when setting the format of the transmitter 21 will now be described.

As shown in FIG. 4, the operator operates the operation portions 51 of the trigger device 50 to select the format of the transmitter 21 (step S1). This inputs the format to the trigger device 50 (trigger device controller 55).

When the format is input, the trigger device controller 55 has the trigger device transmission circuit 52 transmit a first trigger signal (step S2). The first trigger signal is a trigger signal that includes the command shifting the state of the transmitter 21 to the standby state.

When the trigger reception unit 31 receives the first trigger signal, the transmitter controller 25 shifts the state of the transmitter 21 to the standby state (step S3). Then, the transmitter controller 25 has the transmission circuit 26 transmit a notification signal notifying that the state of the transmitter 21 has been shifted to the standby state.

When the trigger device reception circuit 53 receives the notification signal, the trigger device controller 55 has the trigger device transmission circuit 52 transmit a second trigger signal that is a trigger signal including a command designating the format (step S4). The format, which is designated by the command included in the second trigger signal, is the format that has been selected in step S1. That is, the format selected in step S1 is designated by the second trigger signal after the first trigger signal has been transmitted.

When the trigger reception unit 31 receives the second trigger signal, the transmitter controller 25 sets one format among the plurality of formats based on the command included in the second trigger signal (step S5). This determines the format in which the transmitter 21 is to function from the plurality of formats.

If the trigger reception unit 31 does not receive the second trigger signal for a predetermined period or longer, the transmitter controller 25 cancels the standby state of the transmitter 21. When the standby state is canceled, the state of the transmitter 21 shifts to the prohibition state.

When the format of the transmitter 21 has been set, the transmitter controller 25 has the transmission circuit 26 transmit a completion signal that is a signal notifying that the setting of the format has been completed.

When the trigger device reception circuit 53 receives the completion signal, the trigger device controller 55 shows on the display 54 that the setting of the format has been completed (step S6). This completes the format setting of the transmitter 21.

As described above, with the mode setting method of the transmitter 21 using the trigger device 50, the first trigger signal is first transmitted to shift the state of the transmitter 21 to the standby state. The transmission of the second trigger signal from the trigger device 50 after the state of the transmitter 21 has been shifted to the standby state sets the mode (format in the present embodiment) of the transmitter 21.

Operation of the transmitter 21, the trigger device 50, the transmitter mode setting system S, and the transmitter mode setting method will now be described.

The transmitter 21 mounted on the corresponding wheel assembly 11 moves together with the vehicle 10. Accordingly, the ambient environment of the transmitter 21 changes as the vehicle 10 moves. Depending on the ambient environment, a signal in a frequency band that is the same as or approximate to the frequency band of the trigger signal may be continuously transmitted. For example, in a parking lot or on a highway, a signal near the band of 125 kHz may be output to detect a vehicle. Such a signal is external noise for the transmitter 21.

If external noise accidentally matches the command of the trigger signal, the transmitter controller 25 will erroneously recognize the external noise as a trigger signal and execute control in accordance with the erroneously recognized command.

In a case when the format is set by external noise (switches), the state of the transmitter 21 will first be shifted to the standby state by external noise, and the format would then be set by external noise. Even when the transmitter controller 25 erroneously recognizes external noise as a trigger signal, as long as the erroneous recognition occurs only once, this will only result in the state of the transmitter 21 being shifted to the standby state and the format would not be set.

Thus, the above embodiment has the advantages described below.

(1) When setting the format of the transmitter 21 with the trigger device 50, there is a need to perform two steps, namely, shifting to the standby state and designation of the format. Even when the transmitter controller 25 erroneously recognizes external noise as a trigger signal, as long as the erroneous recognition occurs only once, the format of the transmitter 21 will not be set. This restricts the setting of the transmitter 21 to an unintended format that would be caused by external noise.

(2) If the transmitter 21 were to be set to an unintended format, the transmitter 21 cannot receive a data signal with the receiver 40. Since the setting of the transmitter 21 to an unintended format is restricted, the receiver 40 receives the data signal transmitted from the transmitter 21.

(3) The trigger device 50 is configured to transmit the first trigger signal and the second trigger signal. Thus, the trigger device 50 can set the format (mode) of the transmitter 21. If a trigger device that can set the format of the transmitter 21 were not available, the transmitter 21 cannot be used. Since the trigger device 50 that corresponds to the transmitter 21 is used to set the format of the transmitter 21, it will be difficult for a transmitter mounted on the wheel assembly 11 to be set to an unintended format when there is external noise.

(4) When the format is input by operating the operation portions 51, the trigger device 50 sequentially transmits the first trigger signal and the second trigger signal. Thus, the operator only needs to input the format to the trigger device 50 to set the format of the transmitter 21. Thus, compared to when performing separate operations to transmit the first trigger signal and to transmit the second trigger signal, the burden on the operator is reduced.

(5) The transmitter mode setting system S is configured to set the format of the transmitter 21 with the trigger device 50. Thus, with regard to a transmitter mounted on the wheel assembly 11, the transmitter 21 would not be easily set to an unintended format by external noise.

(6) With the mode setting method of the transmitter 21 using the trigger device 50, the format is set by performing two steps. Thus, the transmitter 21 of which the format is set through two steps, namely, the shifting to the standby state and the designation of the format, is used as a transmitter mounted on the wheel assembly 11. Usage of the transmitter 21 restricts the setting of the transmitter 21 to an unintended mode by external noise.

The above embodiment may be modified as follows.

With regard to a mode related to the transmission protocol of a data signal or the like, a mode other than the format may also be set by performing two steps. For example, when the transmitter 21 is in the standby state, the mode of the transmitter 21 may be set (switched) only when the mode related to the transmission protocol is designated. In this case, the format of the transmitter 21 may be set by shifting to the standby state and designating the format. Alternatively, the format of the transmitter 21 may be set without shifting to the standby state. That is, among the modes of the transmitter 21, a mode that requires the state of the transmitter 21 to be shifted to the standby state when setting the mode may be selected.

The trigger device 50 may be configured to transmit the first trigger signal and the second trigger signal through separate operations as long as the trigger device 50 transmits the first trigger signal and the second trigger signal. In this case, the operator operates the operation portions 51 of the trigger device 50 to transmit the first trigger signal from the trigger device 50. Subsequently, the operator operates the operation portions 51 of the trigger device 50 to transmit the second trigger signal from the trigger device 50.

The format may correspond to a single vehicle model.

The frequency band of the trigger signal may be changed.

The transmitter 21 may be configured to function in one of a plurality of formats by writing format information (program) of the selected format to the memory 25*b* with the trigger device 50. That is, the transmitter 21 may be configured to function in one of the plurality of formats that are stored in the memory 25*b*. Alternatively, a program may be written to the memory 25*b* so that the transmitter 21 functions in the format selected with the trigger device 50.

The transmitter 21 does not necessarily have to be configured to function in one format selected from the plurality of formats. That is, the transmitter 21 may be a transmitter that functions in a predetermined format.

The notification signal notifying that the state of the transmitter 21 has been shifted to the standby state does not necessarily have to be transmitted. In this case, the trigger device controller 55 transmits the second trigger signal after a predetermined period subsequent to the transmission of the first trigger signal. The predetermined period, for example, is a period from when the first trigger signal has been transmitted to when the state of the transmitter 21 is shifted to the standby state.

The vehicle may be a two-wheel vehicle or a vehicle that includes five or more wheel assemblies 11.

10) vehicle; 11) wheel assembly; 13) tire; 21) transmitter; 22) pressure sensor; 25) transmitter controller (controller); 26) transmission circuit (transmission unit); 31) trigger reception unit; 40) receiver; 50) trigger device; 52) trigger device transmission circuit (trigger device transmission unit); 55) trigger device controller

The invention claimed is:

1. A trigger device configured to transmit a trigger signal to a transmitter that is mounted on each of a plurality of wheel assemblies included in a vehicle and executes a process in accordance with a command included in the trigger signal, the trigger device comprising:
   a trigger device transmission unit configured to transmit the trigger signal;
   a trigger device reception circuit configured to receive a signal returned from the transmitter; and
   a trigger device controller configured to control the trigger device, wherein
   the trigger device controller is configured to transmit from the trigger device transmission unit, the trigger signal including a command shifting a state of the transmitter to a standby state that allows a mode to be set, the trigger signal including a command designating the mode of the transmitter, and the trigger device controller is configured to receive a notification signal notifying that the state of the transmitter has been shifted to the standby state, wherein the transmitter is configured to function in a format selected by the trigger device in a plurality of formats, and the trigger device controller is configured so that when the format is input to the trigger device by operating the trigger device, the trigger device controller sequentially transmits from the trigger device transmission unit trigger signal including the command shifting the state of the transmitter to the standby state trigger signal including the command designating the format as the mode.

2. A transmitter mode setting system comprising:

a transmitter that is mounted on each of a plurality of wheel assemblies included in a vehicle; and a trigger device that transmits a trigger signal including a command to the transmitter, wherein a mode of the transmitter is set with the trigger device, the trigger device includes a trigger device transmission unit configured to transmit the trigger signal;

a trigger device reception circuit configured to receive a signal returned from the transmitter;

a trigger device controller configured to control the trigger device, wherein the trigger device controller is configured to have the trigger device transmission unit transmit the trigger signal including a command shifting a state of the transmitter to a standby state that allows the mode to be set and the trigger signal including a command designating the mode of the transmitter, and the trigger device controller is configured to receive a notification signal notifying that the state of the transmitter has been shifted to the standby state, the transmitter is configured to function in a format selected by the trigger device in a plurality of formats, and the trigger device controller is configured so that when the format is input to the trigger device by operating the trigger device, the trigger device controller sequentially transmits from the trigger device transmission unit the trigger signal including the command shifting the state of the transmitter to the standby state and the trigger signal including the command designating the format as the mode, and the transmitter includes a pressure sensor configured to detect a pressure of a tire;

a transmission unit configured to transmit a data signal including a detection result of the pressure sensor to a receiver;

a trigger reception unit configured to receive the trigger signal; and a controller configured to control the transmitter, wherein the controller is configured so that when the trigger reception unit receives the trigger signal including the command shifting the state of the transmitter to the standby state, the controller shifts the state of the transmitter to the standby state, wherein the controller is configured so that when the state of the transmitter has been shifted to the standby state, the transmission unit transmits the notification signal to the trigger device, and the controller is configured so that when the trigger reception unit receives the trigger signal including the command designating the mode while the state of the transmitter is the standby state, the controller sets the designated mode.

3. A method for setting a mode of a transmitter with a trigger device, the transmitter being configured to function in a format selected by the trigger device in a plurality of formats, and the trigger device including a trigger device controller that is configured to that when the format is input to the trigger device by operating the trigger device, the trigger device controller sequentially transmits from a trigger device transmission unit a trigger signal including a command shifting a state of the transmitter to a standby state and the trigger signal including a command shifting a state of the transmitter to a standby state and the trigger signal including a command designating a format as a mode, the method comprising:

transmitting a trigger signal including a command shifting the state of the transmitter to the standby state that allows the mode to be set from the trigger device;

transmitting a notification signal from the transmitter to the trigger device after shifting the state of the transmitter to the standby state, the notification signal notifying that the state of the transmitter has been shifted to the standby state; and setting the mode of the transmitter by transmitting the trigger signal including the command designating the mode from the trigger device after receiving the notification signal from the transmitter by the trigger device.

* * * * *